US012570576B2

(12) United States Patent
Fang et al.

(10) Patent No.: US 12,570,576 B2
(45) Date of Patent: Mar. 10, 2026

(54) POTASSIUM ALUMINOSILICATE-BASED NANOGEL PRECURSOR ADDITIVE AND PREPARATION METHOD AND USE THEREOF IN LOW CALCIUM SYSTEM-BASED GEOPOLYMER

(71) Applicant: SHENZHEN UNIVERSITY, Shenzhen (CN)

(72) Inventors: Yuan Fang, Shenzhen (CN); Dapeng Zheng, Shenzhen (CN); Hongzhi Cui, Shenzhen (CN)

(73) Assignee: Shenzhen University, Shenzhen (CN)

( * ) Notice: Subject to any disclaimer, the term of this patent is extended or adjusted under 35 U.S.C. 154(b) by 635 days.

(21) Appl. No.: 17/921,201

(22) PCT Filed: Jun. 20, 2022

(86) PCT No.: PCT/CN2022/099661
§ 371 (c)(1),
(2) Date: Oct. 25, 2022

(87) PCT Pub. No.: WO2023/024672
PCT Pub. Date: Mar. 2, 2023

(65) Prior Publication Data
US 2024/0217874 A1     Jul. 4, 2024

(30) Foreign Application Priority Data

Aug. 23, 2021    (CN) .......................... 202110967918.3

(51) Int. Cl.
| | |
|---|---|
| *C01B 33/26* | (2006.01) |
| *C04B 7/24* | (2006.01) |
| *C04B 12/00* | (2006.01) |
| *C04B 14/04* | (2006.01) |
| *C04B 14/10* | (2006.01) |
| *C04B 18/14* | (2006.01) |
| *C04B 28/00* | (2006.01) |
| *C04B 40/00* | (2006.01) |

(52) U.S. Cl.
CPC ............ *C04B 14/045* (2013.01); *C01B 33/26* (2013.01); *C04B 7/243* (2013.01); *C04B 12/005* (2013.01); *C04B 14/106* (2013.01); *C04B 18/141* (2013.01); *C04B 28/006* (2013.01); *C04B 28/008* (2013.01); *C01P 2004/03* (2013.01); *C01P 2004/62* (2013.01);

*C01P 2004/64* (2013.01); *C04B 40/0039* (2013.01); *Y02P 40/10* (2015.11)

(58) Field of Classification Search
CPC ..... C04B 14/045; C04B 7/243; C04B 12/005; C04B 14/106; C04B 18/141; C04B 28/006; C04B 28/008; C04B 40/0039; C04B 14/04; C04B 14/10; C04B 18/14; C04B 28/00; C04B 20/008; C04B 18/08; C04B 22/062; C04B 14/303; C04B 22/06; C01B 33/26; C01P 2004/03; C01P 2004/62; C01P 2004/64; Y02P 40/10
See application file for complete search history.

(56) References Cited

PUBLICATIONS

Liu, B.; Zhu, C.; Zhuang, K.; Shuai, L.; Li, D.; Long, W.; Xing, F.; Fang, Y. Insights into the Microstructure of Hydrothermal Synthesized Nanoscale K2O-Al2O3-SiO2-H2O Particles. Nanomaterials 2020, 10, 63. doi: 10.3390/nano10010063 (Year: 2019).*
Yang, J.; Li, D.; Fang, Y. Synthesis of Nanoscale CaO-Al2O3-SiO2-H2O and Na2O-Al2O3-SiO2-H2O Using the Hydrothermal Method and Their Characterization. Materials 2017, 10, 695. doi: 10.3390/ma10070695 (Year: 2017).*

* cited by examiner

*Primary Examiner* — Amber R Orlando
*Assistant Examiner* — Marites A Guino-O Uzzle
(74) *Attorney, Agent, or Firm* — Mark C. Johnson; Johnson Dalal

(57) ABSTRACT

The present disclosure provides a potassium aluminosilicate-based nanogel precursor additive and use thereof in a low calcium system-based geopolymer, belonging to the technical field of geopolymer additives. In the present disclosure, the potassium aluminosilicate-based nanogel precursor additive has a high-activity and potassium aluminosilicate-based short-chain structure, and is a precursor of the low calcium system-based geopolymer. The additive includes $K_2O$, $SiO_2$, and $Al_2O_3$, and has a K/Si molar ratio of 1.0 to 4.0 and an Al/Si molar ratio of 0.25 to 1.5. The potassium aluminosilicate-based nanogel precursor additive can be added to a matrix material of the low calcium system-based geopolymer, to effectively optimize a hydration process, balance an internal reaction, and improve a pore structure of the low calcium system-based geopolymer such as metakaolin, thereby improving mechanical properties. The additive effectively avoids harsh curing conditions, uneven hydration reaction.

11 Claims, 4 Drawing Sheets a b

POTASSIUM ALUMINOSILICATE-BASED NANOGEL PRECURSOR ADDITIVE AND PREPARATION METHOD AND USE THEREOF IN LOW CALCIUM SYSTEM-BASED GEOPOLYMER

CROSS REFERENCE TO RELATED APPLICATION

This application claims priority to a Chinese patent application CN202110967918.3 filed to the China National Intellectual Property Administration (CNIPA) on Monday, Aug. 23, 2021 and entitled "POTASSIUM ALUMINOSILICATE-BASED NANOGEL PRECURSOR ADDITIVE AND PREPARATION METHOD AND USE THEREOF IN LOW CALCIUM SYSTEM-BASED GEOPOLYMER", which is herein incorporated by reference in its entirety.

TECHNICAL FIELD

The present disclosure relates to the technical field of geopolymer additives, in particular to a potassium aluminosilicate-based nanogel precursor additive and a preparation method and use thereof in a low calcium system-based geopolymer.

BACKGROUND ART

Geopolymer is a novel gel material of high research value since the last century due to environmental protection and energy saving during production, simple process, and excellent durability.

However, the unstable properties hinder promotion of geopolymers in the construction field. In particular, low calcium system-based geopolymers such as metakaolin have unstable mechanical properties, uneven hydration affecting workability and pore distribution inside components, excessive shrinkage, and easy cracking.

China is a major kaolin producer in the world, accounting for 78% of a total output worldwide; there are not less than 700 metakaolin deposits, with a great potential for use in the low calcium system-based geopolymers. Therefore, it is highly necessary to conduct researches on performance improvement of the low calcium system-based geopolymers.

SUMMARY

In view of this, an objective of the present disclosure is to provide a potassium aluminosilicate-based nanogel precursor additive and use thereof in a low calcium system-based geopolymer. The potassium aluminosilicate-based nanogel precursor additive has excellent effects on improving mechanical properties of the low calcium system-based geopolymer and improving an internal pore structure.

To achieve the above objective, the present disclosure provides the following technical solutions.

The present disclosure provides a potassium aluminosilicate-based nanogel precursor additive, including $K_2O$, $SiO_2$, and $Al_2O_3$, where the potassium aluminosilicate-based nanogel precursor additive has a K/Si molar ratio of 1.0 to 4.0 and an Al/Si molar ratio of 0.25 to 1.5.

Preferably, the potassium aluminosilicate-based nanogel precursor additive may have a particle size of 100 nm to 300 nm.

Preferably, the potassium aluminosilicate-based nanogel precursor additive may further have microcrystalline particles.

The present disclosure further provides a preparation method of the potassium aluminosilicate-based nanogel precursor additive, including the following steps:

mixing potassium hydroxide, nano-silica, and nano-alumina with water, and conducting a hydrothermal synthesis reaction to obtain the potassium aluminosilicate-based nanogel precursor additive.

Preferably, the nano-silica and the nano-alumina each may have a particle size of 10 nm to 100 nm.

Preferably, the potassium hydroxide, the nano-silica, the nano-alumina, and water may have a mass ratio of (4-15):(1.5-4):(0.75-2):(30-100).

Preferably, the mixing may be conducted at 70° C. to 100° C.

Preferably, the mixing may specifically include: dissolving the potassium hydroxide in water, heating to 70° ° C. to 100° C., adding the nano-silica and mixing for 1 min to 2 min, adding the nano-alumina and mixing for 1 min to 2 min, and mixing a final mixture under airtight conditions for 30 min to 90 min; preferably, the hydrothermal synthesis reaction may be conducted at 70° C. to 100° C. for 2 h to 12 h.

The present disclosure further provides use of the potassium aluminosilicate-based nanogel precursor additive or a potassium aluminosilicate-based nanogel precursor additive prepared by the preparation method in a low calcium system-based geopolymer.

Preferably, a use method of the potassium aluminosilicate-based nanogel precursor additive may include the following step: mixing the potassium aluminosilicate-based nanogel precursor additive, an alkali activator, and a raw material including one or more of slag, metakaolin, and low-calcium fly ash.

Preferably, the potassium aluminosilicate-based nanogel precursor additive may be added at 1% to 8% of a mass of the slag.

The present disclosure provides a potassium aluminosilicate-based nanogel precursor additive, including $K_2O$, $SiO_2$, and $Al_2O_3$, where the potassium aluminosilicate-based nanogel precursor additive has a K/Si molar ratio of 1.0 to 4.0 and an Al/Si molar ratio of 0.25 to 1.5. The potassium aluminosilicate-based nanogel precursor additive has a high-activity and potassium aluminosilicate-based short-chain structure. When added to a matrix material containing metakaolin, the additive can guide polymerization of the matrix material to optimize a hydration process. Therefore, the additive can avoid a random and disordered hydration reaction of geopolymer particles in the whole range that may lead to an uneven internal structure of the component caused by insufficient hydration during initial pouring, thus affecting the mechanical properties. The potassium aluminosilicate-based nanogel precursor additive has a small amount of microcrystalline particles, which can play a crystal nucleus effect to guide the geopolymer particles to attach to a nano-precursor of the potassium aluminosilicate-based nanogel precursor additive for hydration, making the internal pore structure of geopolymer matrix material more uniform and dense.

DETAILED DESCRIPTION OF THE EMBODIMENTS

Figure 1:
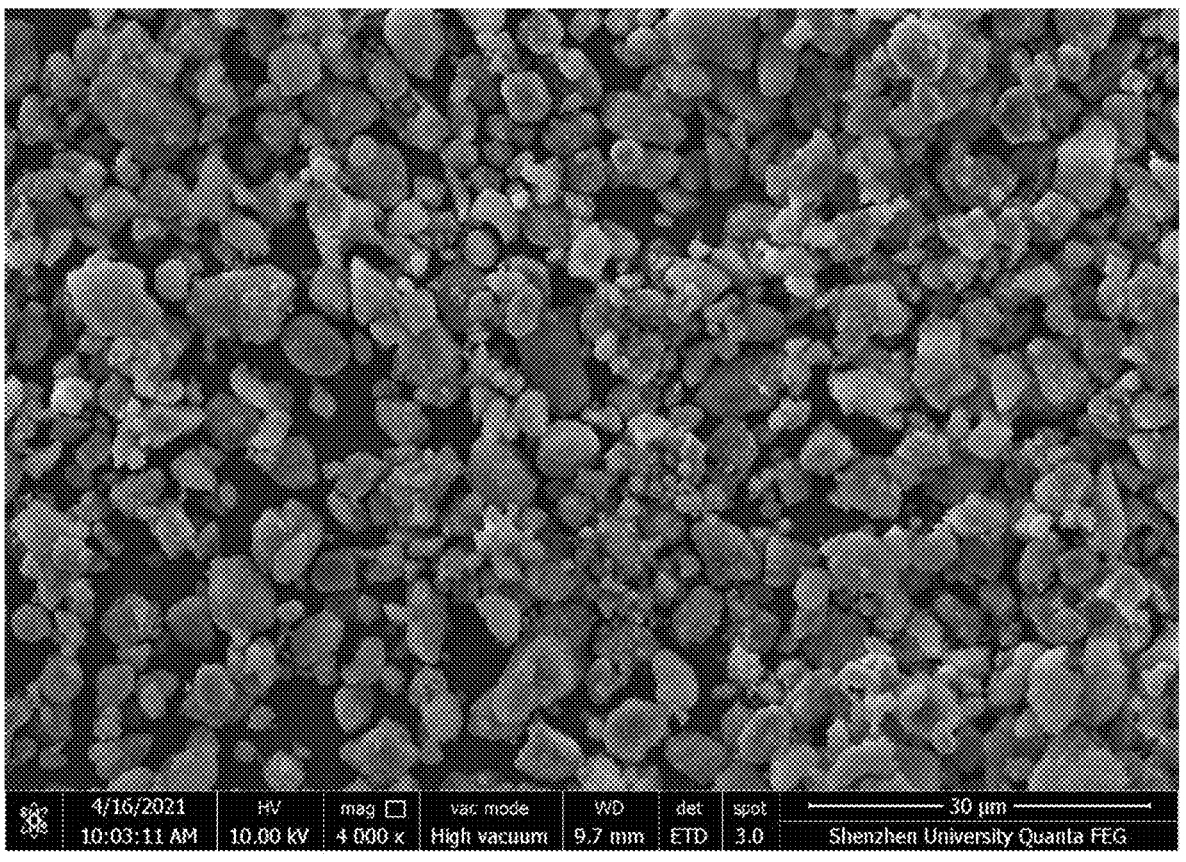
FIG. 1 shows a scanning electron microscope (SEM) image of a potassium aluminosilicate-based nanogel precursor additive prepared in Example 1.

The present disclosure is further described below with reference to the accompanying drawings and examples.

The present disclosure provides a potassium aluminosilicate-based nanogel precursor additive, including $K_2O$, $SiO_2$, and $Al_2O_3$, where the potassium aluminosilicate-based nanogel precursor additive has a K/Si molar ratio of 1.0 to 4.0, preferably 0.8 to 1.8, more preferably 1 to 1.5 and an Al/Si molar ratio of 0.25 to 1.5, preferably 0.5 to 1.25, more preferably 0.75 to 1.

In the present disclosure, the nano-silica and the nano-alumina each have a particle size of preferably 10 nm to 100 nm, more preferably 30 nm to 80 nm, and most preferably 50 nm to 60 nm. The potassium aluminosilicate-based nanogel precursor additive has a particle size of preferably 100 nm to 300 nm, more preferably 150 nm to 250 nm, and most preferably 200 nm to 250 nm. The potassium aluminosilicate-based nanogel precursor additive is a nanoscale material with a low particle size, can fill the geopolymer as a micro-aggregate to reduce porosity and improve compactness of the geopolymer.

The present disclosure further provides a preparation method of the potassium aluminosilicate-based nanogel precursor additive, including the following steps:

mixing potassium hydroxide, nano-silica, and nano-alumina with water, and conducting a hydrothermal synthesis reaction to obtain the potassium aluminosilicate-based nanogel precursor additive.

In the present disclosure, unless otherwise specified, all raw material components are commercially available products well known to those skilled in the art.

In the present disclosure, the nano-silica and the nano-alumina each have a particle size of preferably 10 nm to 100 nm, more preferably 30 nm to 80 nm, and most preferably 50 nm to 60 nm. The potassium hydroxide, the nano-silica, the nano-alumina, and the water have a mass ratio of preferably (4-15):(1.5-4):(0.75-2):(30-100), more preferably (5-12):(2-3.5):(0.8-1.5):(40-80), and most preferably (8-10):(2.5-3):(1-1.2):(50-80). The water is preferably deionized water.

In the present disclosure, the mixing is conducted at preferably 70° C. to 100° C., more preferably 75° ° C. to 95° C., and most preferably 80° ° C. to 90° C. by preferably stirring at preferably 180 r/min to 250 r/min, more preferably 190 r/min to 230 r/min, and most preferably 200 r/min to 210 r/min. The mixing specifically includes preferably: dissolving the potassium hydroxide in water, heating to 70° ° C. to 100° C., adding the nano-silica and mixing for 1 min to 2 min, adding the nano-alumina and mixing for 1 min to 2 min, and mixing a final mixture under airtight conditions for 30 min to 90 min, more preferably 50 min to 60 min. The mixing is conducted preferably in a Teflon vessel.

In the present disclosure, the hydrothermal synthesis reaction is conducted at preferably 70° ° C. to 100° C., more preferably 75° C. to 95° C., and most preferably 80° C. to 90° C. for preferably 2 h to 12 h, more preferably 3 h to 10 h, and most preferably 5 h to 8 h under preferably standing and airtight conditions; the hydrothermal synthesis reaction is conducted under airtight conditions, which can isolate water-vapor exchange with the outside world, and provide a high-pressure reaction environment, thereby accelerating the hydrothermal synthesis reaction and promoting the combination of silicon-aluminum bonds. During the hydrothermal synthesis reaction, the microstructure undergoes the following four stages: depolymerization, short-range polymerization, structural rearrangement, and disordered polycondensation.

In the present disclosure, after the hydrothermal synthesis reaction, preferably a hydrothermal synthesis reaction system is subjected to solid-liquid separation, and a supernatant is removed; an obtained solid product is washed with water, dried and ground successively to obtain the potassium aluminosilicate-based nanogel precursor additive. The solid-liquid separation is conducted by preferably centrifugal separation, at preferably 3,000 r/min to 8,000 r/min, more preferably 4,000 r/min to 7,000 r/min, and most preferably 5,000 r/min to 6,000 r/min for preferably 3 min to 10 min, more preferably 5 min to 8 min, and most preferably 6 min to 7 min. The washing with water is conducted preferably by adding deionized water to the solid product, stirring and mixing, conducting centrifugation, and removing a supernatant; the centrifugal separation is conducted by preferably the same conditions as the above centrifugal separation, which will not be repeated here; the washing with water is conducted preferably 2 to 5 times, more preferably 3 to 4 times, to remove potassium hydroxide on a surface of the solid product. The drying is conducted by preferably vacuum drying at preferably 40° C. to 80° C., more preferably 55° C. to 65° C. for preferably 24 h to 72 h, more preferably 36 h to 48 h. There is no special limitation on the grinding, as long as the potassium aluminosilicate-based nanogel precursor additive has a particle size of 100 nm to 300 nm.

The preparation method provided by the present disclosure has simple operation, low-cost and readily-available reaction raw materials, and low energy consumption. The potassium aluminosilicate-based nanogel precursor additive can effectively improve mechanical properties and optimize an internal pore structure of the geopolymer.

The present disclosure further provides use of a potassium aluminosilicate-based nanogel precursor additive prepared by the preparation method in a low calcium system-based geopolymer. A use method of the potassium aluminosilicate-based nanogel precursor additive includes preferably the following step: mixing the potassium aluminosilicate-based nanogel precursor additive, an alkali activator, and a raw material. There is no special limitation on a speed and time of the mixing, as long as the raw materials can be mixed uniformly. The raw material includes one or more of slag, metakaolin, and low-calcium fly ash; there is no special limitation on the slag, the metakaolin, and the low-calcium fly ash, and the slag, the metakaolin, and the low-calcium fly ash well-known to those skilled in the art can be used. The potassium aluminosilicate-based nanogel precursor additive is added at 1% to 8%, more preferably 2% to 6%, and most preferably 3% to 5% of a mass of the raw material.

The potassium aluminosilicate-based nanogel precursor additive can be added to a geopolymer matrix material containing metakaolin, to effectively optimize a hydration process, balance an internal reaction, and improve a pore structure of the low calcium system-based geopolymer, thereby improving mechanical properties. The additive effectively avoids harsh curing conditions and substandard mechanical properties of the low calcium system-based geopolymer, providing a feasible solution for use of the metakaolin.

The technical solutions in the present disclosure are clearly and completely described below in conjunction with examples of the present disclosure. It is clear that the described examples are merely a part, rather than all of the examples of the present disclosure. All other examples obtained by a person of ordinary skill in the art based on the examples of the present disclosure without creative efforts shall fall within the protection scope of the present disclosure.

Example 1

300 parts of deionized water and 30 parts by mass of KOH were added to a Teflon reaction tank; the Teflon tank was placed into a water bath pot with a stirring rate of 200 r/min and a working temperature of 95° C.; after being heated to 95° C., 16 parts by mass of nano-$SiO_2$ with a particle size of 50 nm to 100 nm was added stirred for 2 min, and 14 parts by mass of nano-$Al_2O_3$ with a particle size of 50 nm to 100 nm was added and stirred for 2 min; the Teflon tank was taken out, sealed with plastic wrap and tape, and then continued to be stirred in the water bath pot for 1 h; a stirring knob was turned off, and a hydrothermal synthesis reaction was conducted at a constant temperature of 95° C. for 4 h; a reaction product was subjected to centrifugal separation at 4,000 r/min for 4 min, a liquid component was discarded, the deionized water was added, stirred for mixing, and centrifugal separation was continued at 4,000 r/min for 4 min; and centrifugation and water washing were repeated 3 times to obtain the potassium aluminosilicate-based nanogel precursor additive; where The potassium aluminosilicate-based nanogel precursor additive had a K/Si molar ratio of 2 and an Al/Si molar ratio of 1.

In this example, the potassium aluminosilicate-based nanogel precursor additive is a low calcium system-based geopolymer gel, with a short-range and disordered amorphous structure.

Figure 2:
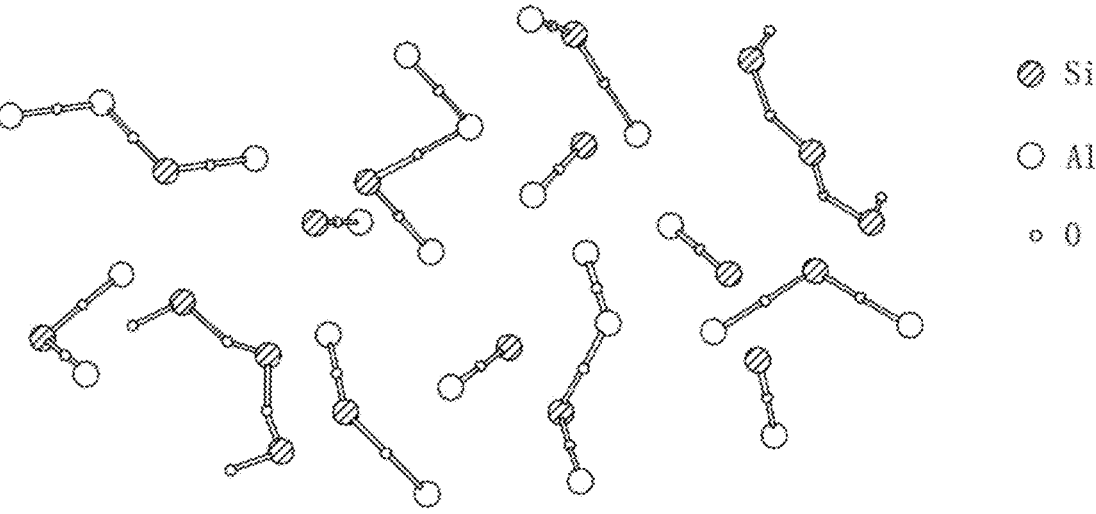
FIG. 2 shows a conceptual diagram of a microstructure of the potassium aluminosilicate-based nanogel precursor additive prepared in Example 1.

A SEM image of the potassium aluminosilicate-based nanogel precursor additive is shown in FIG. 1. A molecular-level microstructure is represented by a short-chain aluminosilicate structure, with a conceptual diagram of structure shown in FIG. 2. Since potassium ions are not used as a component of the structural framework, and play a role of balancing the charge when aluminum atoms are combined with silicon atoms to form Si—O—Al bonds. Among them, potassium ions are not shown in FIG. 2.

Use Example 1

20 g of the potassium aluminosilicate-based nanogel precursor additive prepared in Example 1, 490 g of slag, 490 g of metakaolin, and 285 g of sodium silicate with a modulus of 2.2 were mixed with 273 g of deionized water evenly, to obtain an experimental group of potassium aluminosilicate-based nanogel precursor additive-modified two-component geopolymer. A slurry was poured into an anti-flexural test die of 40 mm×40 mm×160 mm and an anti-compression test die of 40 mm×40 mm×40 mm, vibrated for 1 min, followed by conducting standard curing (temperature 25° C.±1° C., humidity >95%) for 7 d and 28 d, where the slag and the metakaolin had a mass ratio of 1:1.

Use Example 2

20 g of the potassium aluminosilicate-based nanogel precursor additive prepared in Example 1, 686 g of slag, 294 g of metakaolin, and 285 g of sodium silicate with a modulus of 2.2 were mixed with 273 g of deionized water evenly, to obtain an experimental group of potassium aluminosilicate-based nanogel precursor additive-modified two-component geopolymer. A slurry was poured into an anti-flexural test die of 40 mm×40 mm×160 mm and an anti-compression test die of 40 mm×40 mm×40 mm, vibrated for 1 min, followed by conducting standard curing (temperature 25° C.±1° C., humidity >95%) for 7 d and 28 d, where the slag and the metakaolin had a mass ratio of 7:3.

Comparative Example 1

0 g of the potassium aluminosilicate-based nanogel precursor additive prepared in Example 1, 500 g of slag, 500 g of metakaolin, and 285 g of sodium silicate with a modulus of 2.2 were mixed with 273 g of deionized water evenly, to obtain a control group of two-component geopolymer. A slurry was poured into an anti-flexural test die of 40 mm×40 mm×160 mm and an anti-compression test die of 40 mm×40 mm×40 mm, vibrated for 1 min, followed by conducting standard curing (temperature 25° ° C.±1° C., humidity >95%) for 7 d and 28 d, where the slag and the metakaolin had a mass ratio of 1:1.

Comparative Example 2

0 g of the potassium aluminosilicate-based nanogel precursor additive prepared in Example 1, 700 g of slag, 300 g of metakaolin, and 285 g of sodium silicate with a modulus of 2.2 were mixed with 273 g of deionized water evenly, to obtain a control group of two-component geopolymer. A slurry was poured into an anti-flexural test die of 40 mm×40 mm×160 mm and an anti-compression test die of 40 mm×40 mm×40 mm, vibrated for 1 min, followed by conducting standard curing (temperature 25° C.±1° C., humidity >95%) for 7 d and 28 d, where the slag and the metakaolin had a mass ratio of 7:3.

Figure 3:
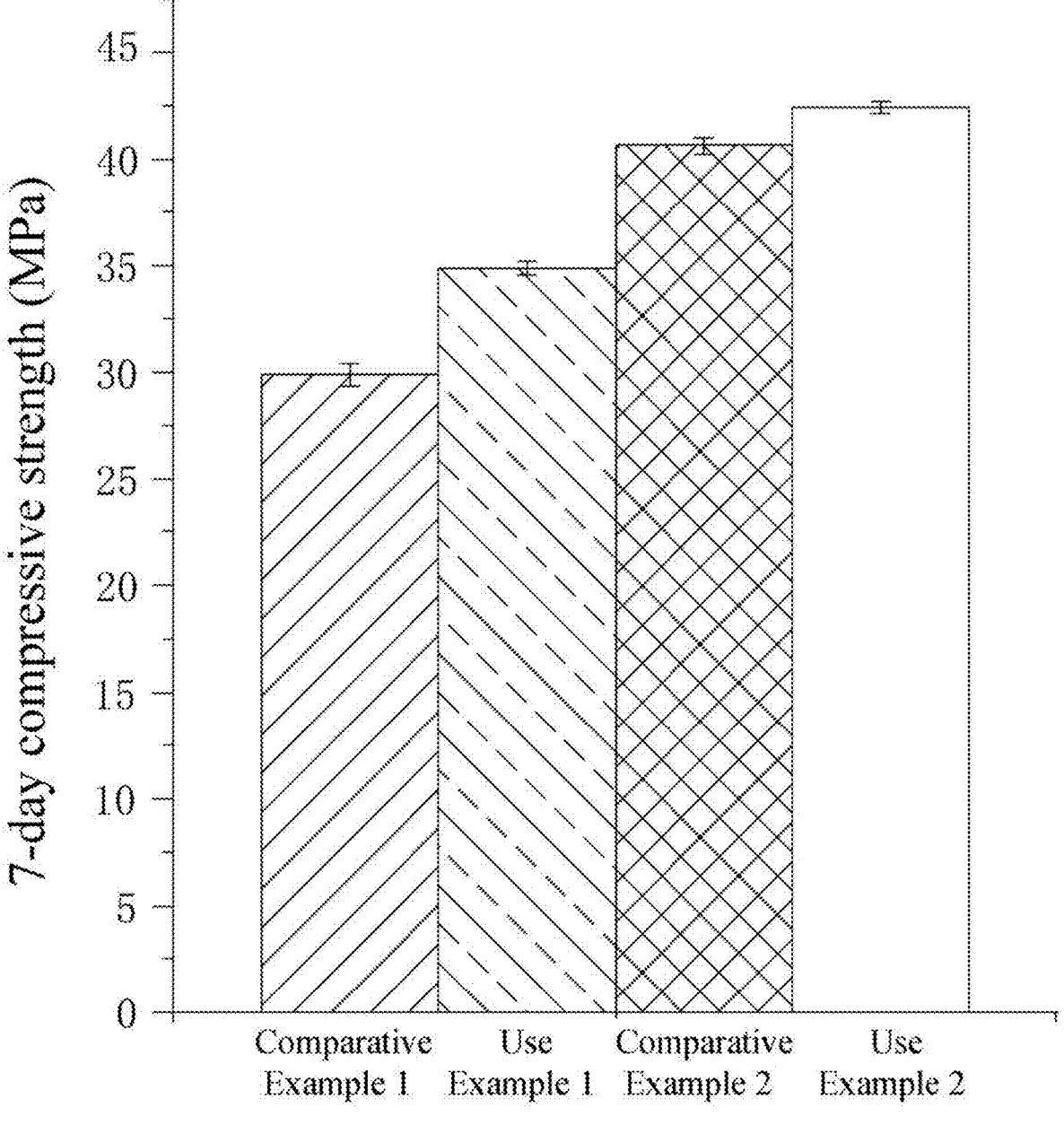
FIG. 3 shows 7-day compressive strengths of test blocks obtained in Use Examples 1 to 2 and Comparative Examples 1 to 2.
Figure 4:
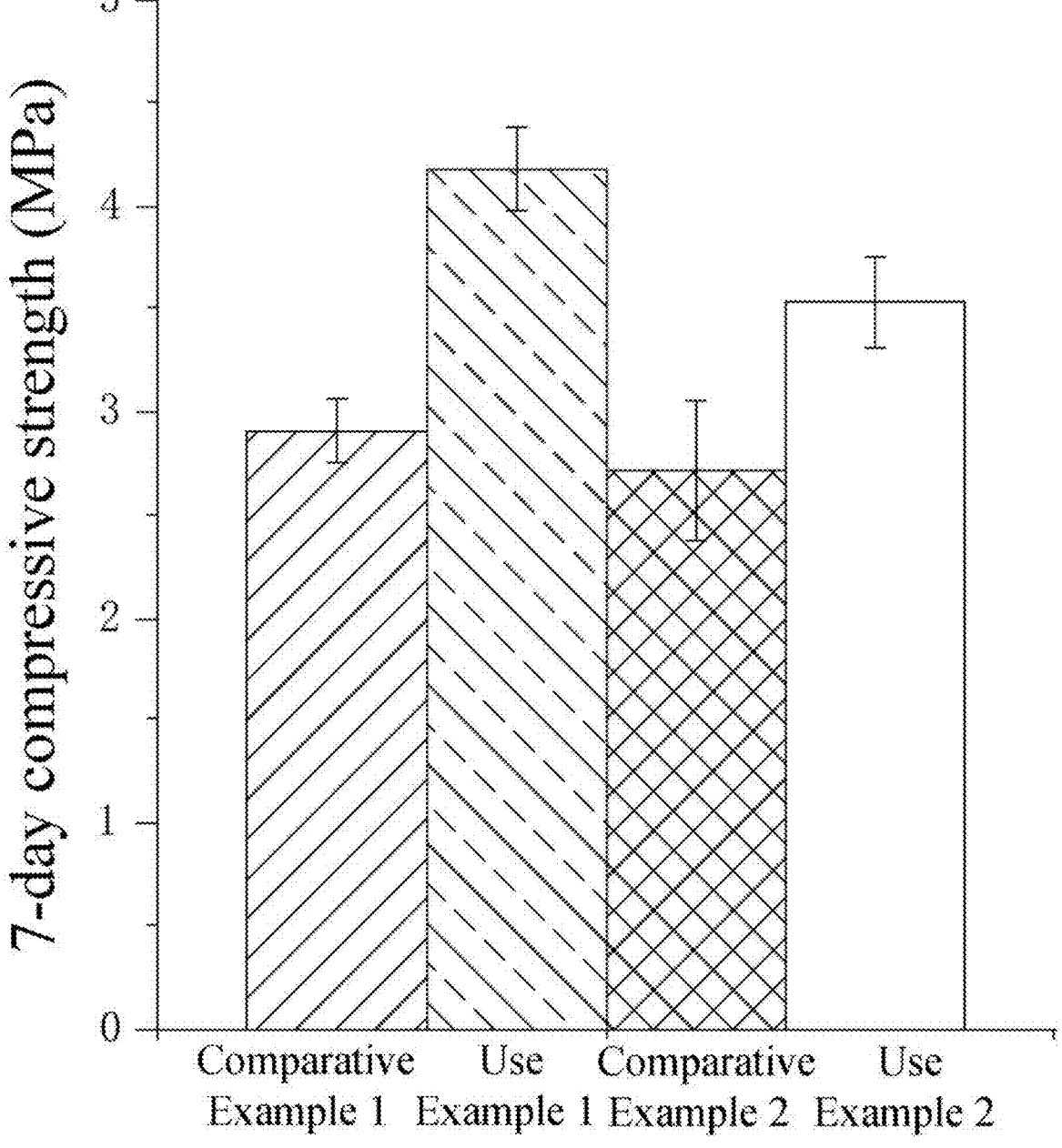
FIG. 4 shows 7-day flexural strengths of the test blocks obtained in Use Examples 1 to 2 and Comparative Examples 1 to 2.

Use Examples 1 to 2 and Comparative Examples 1 to 2 were tested by a computer-controlled compressive testing machine, to obtain a 7-day compressive strength of the test blocks shown in FIG. 3, and a 7-day flexural strength of the test blocks shown in FIG. 4. It can be seen from FIG. 3 and FIG. 4 that when a curing time of the test blocks is 7 d, the compressive and flexural strengths of the use examples are generally improved compared with those of the comparative examples. The compressive strength and flexural strength of the matrix material (slag+metakaolin) with a 1:1 composition of Use Example 1 and Comparative Example 1 have increased by 16.6% and 43.7%, respectively; the compressive strength and flexural strength of the matrix material with a 7:3 composition of Use Example 2 and Comparative Example 2 have increased by 4.5% and 30.2%, respectively. This shows that the potassium aluminosilicate-based nanogel precursor additive has an effect of improving the compressive and flexural strengths of the geopolymer, and the effect is more obvious for the matrix material with higher metakaolin content.

Figure 5A:
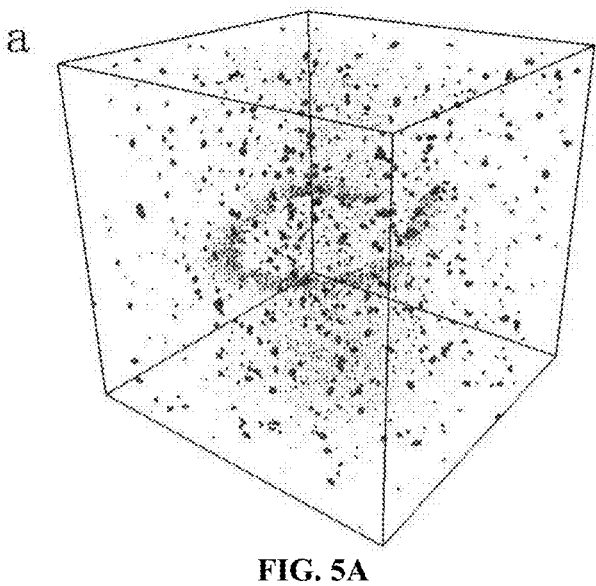
FIG. 5 shows an X-ray computed tomography (XCT) model diagram of internal pore distribution of the test blocks obtained in Use Example 1 and Comparative Example 1, where a is Comparative Example 1, and b is Use Example 1.
Figure 5B:
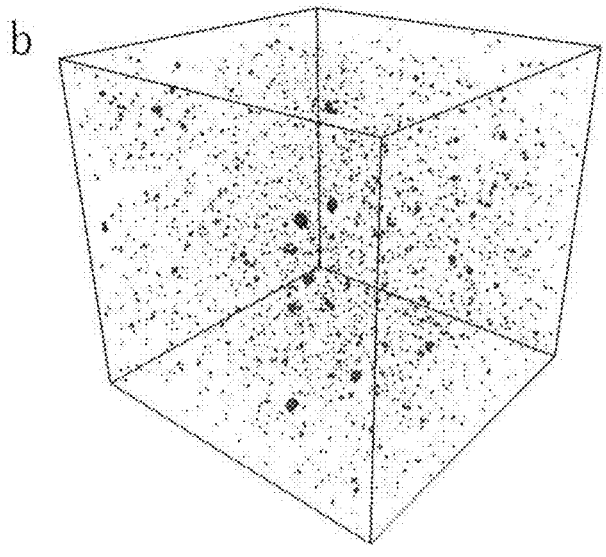

Comparative Example 1 and Use Example 1 were tested using a three-dimensional reconstructed imaging X-ray microscope. FIG. 5 shows an XCT model of internal pore distribution of a 1-day geopolymer before and after adding the potassium aluminosilicate-based nanogel precursor additive, where a is before adding (Comparative Example 1), and b is after adding (Use Example 1). It can be seen from FIG. 5 that after adding the potassium aluminosilicate-based nanogel precursor additive, the geopolymer has a more uniform pore distribution, which is beneficial to the structural stress; a total porosity decreases, a proportion of macroporosity decreases significantly, and a proportion of small porosity increases, which is beneficial to improve self-shrinking properties of the geopolymer.

The above description of examples is merely provided to help illustrate the method of the present disclosure and a core idea thereof. It should be noted that several improvements and modifications may be made by persons of ordinary skill in the art without departing from the principle of the present disclosure, and these improvements and modifications should also fall within the protection scope of the present disclosure. Various amendments to these embodiments are apparent to those of professional skill in the art, and the general principles defined herein may be implemented in other embodiments without departing from the spirit or scope of the present disclosure. Thus, the present disclosure is not limited to the examples shown herein but falls within the widest scope consistent with the principles and novel features disclosed herein.

What is claimed is:

1. A preparation method of a potassium aluminosilicate-based nanogel precursor additive with $K_2O$, $SiO_2$, $Al_2O_3$, having a K/Si molar ratio of 1.0 to 4.0, and having an Al/Si molar ratio of 0.25 to 1.5 comprising the following steps:

mixing potassium hydroxide, nano-silica, and nano-alumina with water; and conducting a hydrothermal synthesis reaction to obtain the potassium aluminosilicate-based nanogel precursor additive, wherein a mass ratio of the potassium hydroxide, the nano-silica, the nano-alumina, and the water is in a range of (4-15):(1.5-4):(0.75-2):(30-100).

2. The preparation method according to claim 1, wherein the nano-silica and the nano-alumina each have a particle size of 10 nm to 100 nm.

3. The preparation method according to claim 1, wherein the mixing is conducted at 70° C. to 100° C.

4. The preparation method according to claim 1, wherein the mixing comprises:

dissolving the potassium hydroxide in water, heating to 70° C. to 100° C., adding the nano-silica and mixing for 1 minute to 2 minutes, adding the nano-alumina and mixing for 1 minute to 2 minutes, and mixing a final mixture under airtight conditions for 30 minutes to 90 minutes.

5. The preparation method according to claim 1, wherein the hydrothermal synthesis reaction is conducted at 70° C. to 100° C. for 2 hours to 12 hours.

6. The preparation method according to claim 1, further comprising:

using the potassium aluminosilicate-based nanogel precursor additive in a low calcium system-based geopolymer.

7. The preparation method according to claim 6, further comprising: mixing the potassium aluminosilicate-based nanogel precursor additive, an alkali activator, and a raw material comprising one or more of slag, metakaolin, and low-calcium fly ash.

8. The preparation method according to claim 7, wherein the potassium aluminosilicate-based nanogel precursor additive is added at 1% to 8% of a mass of the raw material.

9. The preparation method according to claim 1, wherein the potassium aluminosilicate-based nanogel precursor additive further has microcrystalline particles.

10. A preparation method of a potassium aluminosilicate-based nanogel precursor additive with $K_2O$, $SiO_2$, $Al_2O_3$, having a K/Si molar ratio of 1.0 to 4.0, and having an Al/Si molar ratio of 0.25 to 1.5 comprising the following steps:

mixing potassium hydroxide, nano-silica, and nano-alumina with water by dissolving the potassium hydroxide in water, heating to 70° C. to 100° C., adding the nano-silica and mixing for 1 minute to 2 minutes, adding the nano-alumina and mixing for 1 minute to 2 minutes, and mixing a final mixture under airtight conditions for 30 minutes to 90 minutes; and conducting a hydrothermal synthesis reaction to obtain the potassium aluminosilicate-based nanogel precursor additive.

11. A preparation method of a potassium aluminosilicate-based nanogel precursor additive with $K_2O$, $SiO_2$, $Al_2O_3$, having a K/Si molar ratio of 1.0 to 4.0, and having an Al/Si molar ratio of 0.25 to 1.5 comprising the following steps:

mixing potassium hydroxide, nano-silica, and nano-alumina with water; and conducting a hydrothermal synthesis reaction conducted at 70° C. to 100° C. for 2 hours to 12 hours to obtain the potassium aluminosilicate-based nanogel precursor additive.

\* \* \* \* \*